United States Patent
Georgis et al.

(10) Patent No.: US 7,773,114 B2
(45) Date of Patent: Aug. 10, 2010

(54) SYSTEM AND METHOD FOR NON-INVASIVE CONVERSION OF FILM CAMERAS INTO DIGITAL CAMERA

(75) Inventors: Nikolaos Georgis, San Diego, CA (US); Djung Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 553 days.

(21) Appl. No.: 11/727,465

(22) Filed: Mar. 27, 2007

(65) Prior Publication Data

US 2008/0239122 A1    Oct. 2, 2008

(51) Int. Cl.
H04N 5/225      (2006.01)
(52) U.S. Cl. .................................. 348/207.99; 348/239
(58) Field of Classification Search ................. 429/429; 348/207.99, 239, 222.1
See application file for complete search history.

(56) References Cited

U.S. PATENT DOCUMENTS

| | | | |
|---|---|---|---|
| 4,479,241 A * | 10/1984 | Buckley | 382/159 |
| 5,920,384 A * | 7/1999 | Borza | 356/71 |
| 6,181,883 B1 | 1/2001 | Oswal | |
| 6,351,282 B1 | 2/2002 | DeLeeuw et al. | |
| 6,370,339 B1 * | 4/2002 | Stern et al. | 396/429 |
| 6,943,820 B2 | 9/2005 | Schmidt | |
| 7,561,789 B2 * | 7/2009 | Border et al. | 396/111 |
| 2003/0055640 A1 * | 3/2003 | Burshtein et al. | 704/235 |
| 2005/0117899 A1 | 6/2005 | Selby | |
| 2005/0282208 A1 * | 12/2005 | Adams et al. | 435/6 |
| 2006/0087561 A1 * | 4/2006 | Kojima et al. | 348/208.5 |
| 2006/0197014 A1 | 9/2006 | Inuiya | |
| 2007/0160360 A1 * | 7/2007 | Mowry | 396/311 |

FOREIGN PATENT DOCUMENTS

| | | |
|---|---|---|
| JP | 2000-261708 A2 | 9/2000 |
| JP | 2000-354184 A2 | 12/2000 |
| JP | 2005-159571 A2 | 6/2005 |
| JP | 2006-121635 A2 | 5/2006 |
| WO | WO-98/15116 A1 | 4/1998 |

OTHER PUBLICATIONS

Imagek EFS-1, "Every 35mm Camera a Digital Camera," http://www.epi-centre.com/reports/imagek.html, (Publication date 1998).

* cited by examiner

*Primary Examiner*—Tuan Ho
(74) *Attorney, Agent, or Firm*—Rader, Fishman & Grauer PLLC

(57) ABSTRACT

A system and method for converting a film camera into a digital camera uses an electronic device placed in a space of the camera that normally contains film. The device includes an image sensing array arranged in optical communication with a lens of the camera when a shutter is open. An audio sensor is used to detect sounds within the camera, and an acoustic pattern recognizer with a built-in training mode is used to determine if the detected sounds correspond with the shutter operation. The image sensing array is switched into an image capture mode when the acoustic pattern recognizer determines that the shutter is being opened. When the shutter is opened, a read-out circuit captures multiple image frames from the image sensing array. An image processor associated with the image sensing array processes the captured images using advanced image processing algorithms.

15 Claims, 5 Drawing Sheets

SYSTEM AND METHOD FOR NON-INVASIVE CONVERSION OF FILM CAMERAS INTO DIGITAL CAMERA

BACKGROUND OF THE INVENTION

1. Field of the Invention

This invention relates to digital photography, and more particularly to noninvasive systems and methods for converting film cameras into digital cameras.

2. Description of the Related Art

Film cameras have been used for many years and have been made in a variety of sizes and formats. For example, typical film cameras have been available in film formats known in the industry as 35 mm, 110, 135, 220, 660, and APS. All of these typical film cameras operate by placing a film canister or cartridge within a cavity of the camera, and sequentially positioning each frame of the film across an aperture in optical communication with a lens when a shutter is opened. As the pictures are taken, the film is advanced by winding the film onto a take-up reel. After all of the pictures have been taken, the film is either rewound off the take-up reel back into the film canister (in the case of 35 mm film), or maintained within a take-up reel canister (in the case of 110, 220 and 660 film). The film is then removed from the camera and must be developed before the pictures are available.

Digital cameras have been developed more recently and are gaining in popularity. Digital cameras typically employ an electronic image sensing array, such as a charge coupled device (CCD) or CMOS image sensing array, which communicates with the lens of the camera. When a picture is taken, the shutter of the camera opens and exposes an image sensing array to light. The image sensing array captures the image, which is then retrieved from the array and stored in a memory. The camera can be coupled to a computer or printer to download the images stored in the memory for immediate on-screen viewing on the computer or printing on the printer. The camera can interface with a computer or printer using a cable, such as a USB cable, or by using a memory device that can be removed from the camera and plugged into a corresponding slot of the computer or printer.

Many photographers are switching from film cameras to digital cameras. However, these photographers often have valuable cameras, lenses, flashes, and other accessories for their film cameras that cannot be used with their new digital cameras.

A number of attempts have been made to provide film cameras with the ability to take digital pictures. For example, U.S. Pat. Nos. 6,370,339 and 6,351,282 both disclose systems for converting conventional film cameras into digital cameras using an electronic apparatus that fits in the area of the camera normally occupied by film. However, these prior attempts to convert film cameras into digital cameras have been met with only limited success.

The present invention seeks to provide an improved system and method for converting standard film cameras into digital cameras.

SUMMARY OF THE INVENTION

A system and method for converting a film camera into a digital camera uses an electronic device placed in a space of the camera that normally contains film. The device includes an image sensing array arranged in optical communication with a lens of the camera when a shutter is open. A read-out circuit is coupled to the image sensing array, and a memory is coupled to the read-out circuit for storing a digital picture obtained from the image sensing array. An audio sensor is included in the electronic device to detect sounds within the camera. An acoustic pattern recognizer connected to the audio sensor determines if the detected sounds correspond with the shutter operation of the camera. The acoustic pattern recognizer has a training mode that can be used after the device is loaded into the camera to develop a set of acoustic patterns specific to the camera in which the device is loaded. The training mode uses signals received from the audio sensor and the image sensing array to determine the particular acoustic pattern that precedes the shutter opening. Once the training mode is completed, the image sensing array will be switched from a low power listening mode into an image capture mode when the acoustic pattern recognizer determines that the shutter is about to be opened.

When the shutter is opened, the read-out circuit operates to capture multiple image frames from the image sensing array. An image processor associated with the image sensing array processes the captured images to determine when to end the image capturing process and to identify and keep only valid images captured during the shutter opening. The image processor also uses advanced image processing algorithms to obtain one or more high quality images from the multiple captured images. For example, the image processor can apply a super-resolution imaging algorithm to synthesize a high-resolution image from a sequence of low-resolution images captured during the shutter opening. The image processor can also use an image enhancement algorithm to enhance an image captured during the shutter opening. The image processor can also be used to compress and store the captured images.

According to one aspect, the present invention provides a system for converting a film camera into a digital camera, comprising: an image sensing array; a read-out circuit coupled to the image sensing array; a memory coupled to the read-out circuit for storing a digital picture derived from an image read-out from the image sensing array; an audio sensor for detecting sounds within the camera; and an acoustic pattern recognizer that compares signals received from the audio sensor to determine if the signals correspond with acoustic patterns associated with shutter operation, the acoustic pattern recognizer having a training mode that can be used to develop a set of acoustic patterns associated with shutter operation based on signals from the audio sensor during the training mode; and the image sensing array having a low power listening mode and an image capture mode and being switchable from the low power listening mode into the image capture mode when the pattern recognizer recognizes an acoustic pattern associated with shutter operation.

According to another aspect, the present invention provides a system for converting a film camera into a digital camera, comprising: an image sensing array; a read-out circuit coupled to the image sensing array; and a memory coupled to the read-out circuit for storing a digital picture derived from an image read-out from the image sensing array; the read-out circuit being operable to capture more than one image frame from the image sensing array during a single opening of a shutter of the film camera.

According to another aspect, the present invention provides a method of taking a digital picture with a film camera, comprising: loading an electronic device comprising a memory unit and an image processor into a space vacated in the absence of film in the camera, and placing an image sensing array in optical communication with a lens of the camera when a shutter is open; detecting sounds within the camera using an audio sensor; and developing a set of acoustic patterns associated with shutter operation based on signals from the audio sensor and the image sensing array during a training mode after the electronic device is loaded into the film camera.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
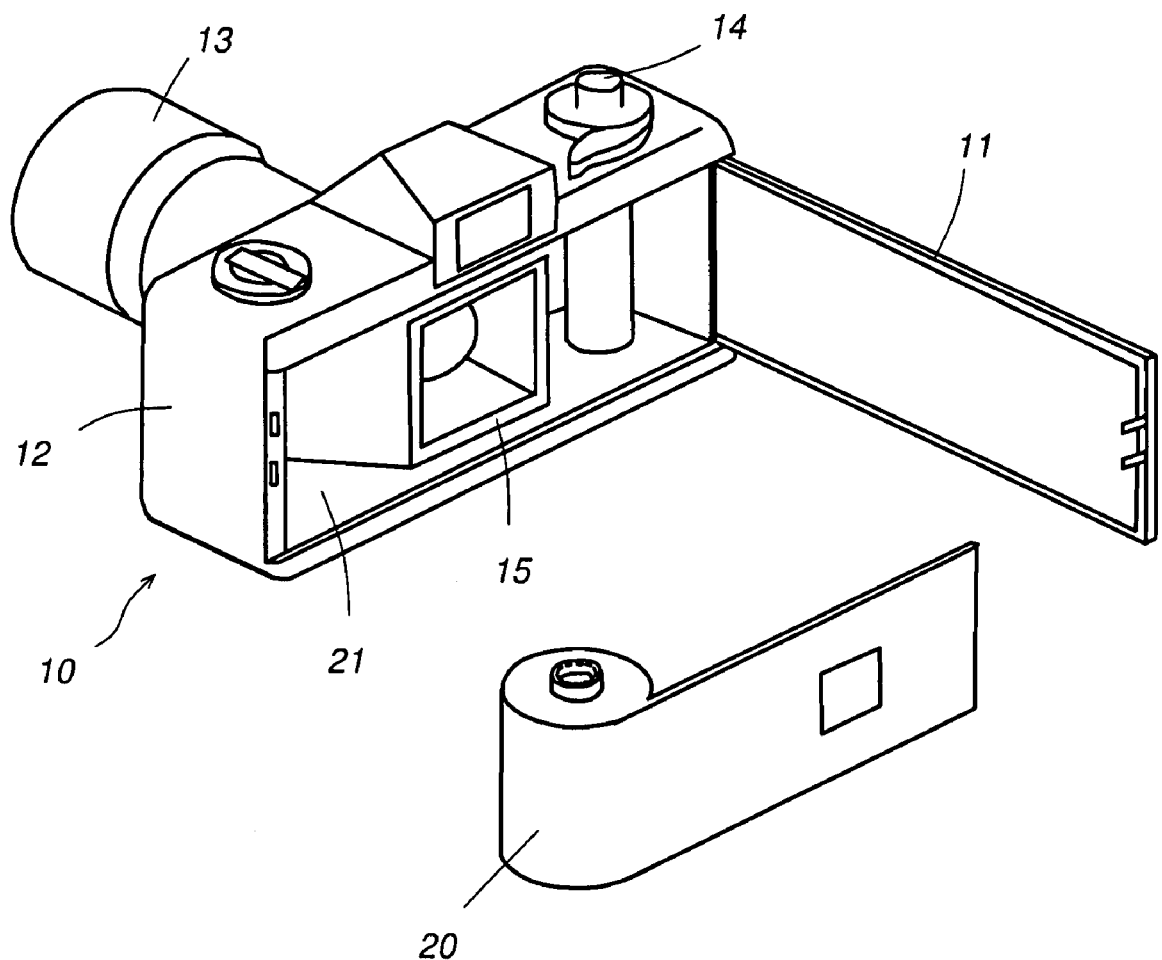
FIG. 1 is a rear perspective illustration of an electronic device of the present invention being inserted into a conventional film camera.

A conventional camera 10 is shown in FIG. 1 with its back cover 11 open. The camera 10 has a body 12, a lens 13, and a shutter button 14. An image focal plane area 15 is provided inside the camera where the lens 13 produces a focused image. Various parts and details of the camera 10 will not be described in detail herein and are well known to those skilled in the art.

Figure 2:
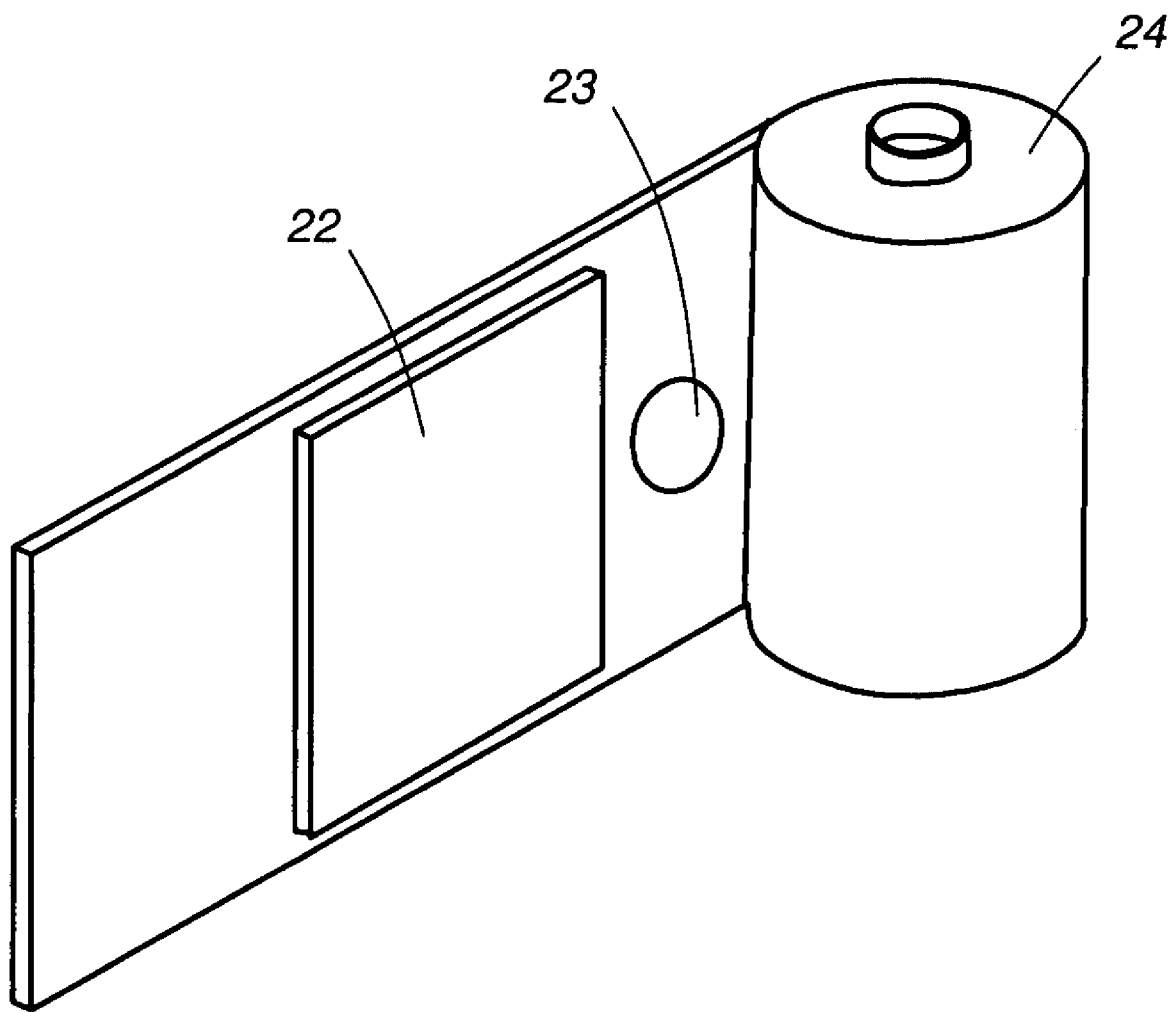
FIG. 2 is a front perspective illustration of the electronic device.

An electronic device 20 according to the present invention is also shown in FIG. 1, and in more detail in FIG. 2. The electronic device 20 is packaged in a shape and size that allow it to fit into the space 21 of the camera 10 normally used to hold the film canister/cartridge and film. The electronic device 20 shown in FIG. 1 is shaped for a 35 mm camera, but the electronic device 20 can be provided in other shapes and sizes to fit into other common types of cameras, such as 110, 135, 220, APS, and so forth.

The electronic device 20 has an image sensor array 22 positioned on its front side at a location that corresponds with the image focal plane area 15 of the camera 10 when the device 20 is loaded into the camera 10. The image sensor array 22 is thus positioned at the same location that a frame of the film would normally be positioned to be exposed to an image. An audio sensor 23 is provided for detecting camera noises during operation. The audio sensor 23 is a sensitive microphone calibrated to pick up all noises from the camera body 12 and operates as the noninvasive interface between the camera body 12 and the electronic device 20. The device 20 also includes a housing 24 in which other electronic circuitry is contained, as further described below.

Figure 3:
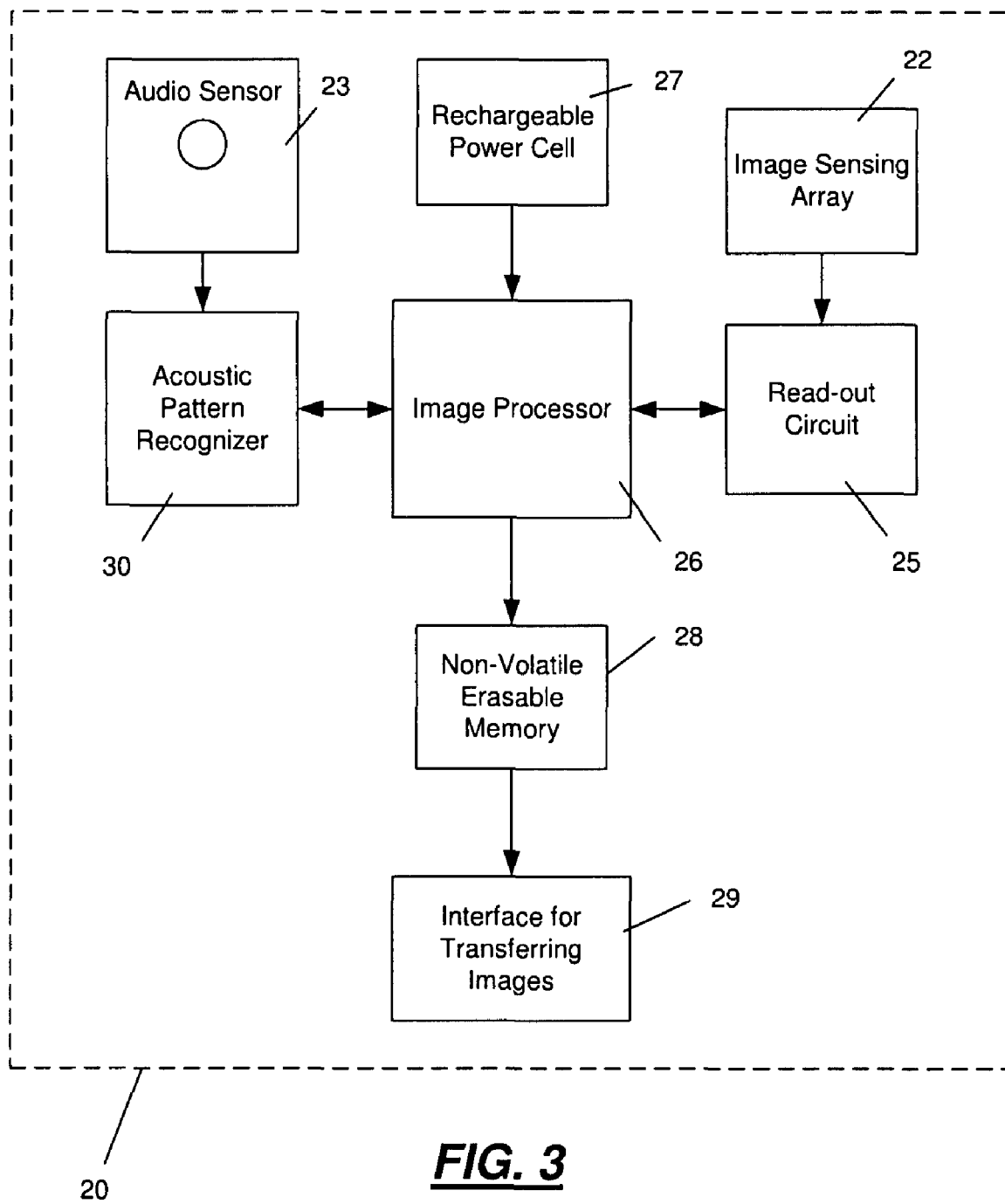
FIG. 3 is a block diagram illustrating the functional elements of the electronic device of the present invention.

The functional elements of the electronic device 20 are illustrated in the block diagram of FIG. 3. The image sensing array 22 is coupled to a read-out circuit 25, which in turn is coupled to an image processor 26. The device 20 also includes a rechargeable power cell 27 for supplying power to the processor 26 and the other components, and a non-volatile erasable memory 28 in which the processed images are stored. An interface 29 is provided for transferring images from the device 20 to an external computer or printer. For example, the interface 29 can be a USB port or a wireless interface, such as a radio frequency transmitter. Alternatively, the non-volatile erasable memory 28 may be a removable flash memory device including but not necessarily limited to Memory Stick™ as provided by Sony Corporation, Tokyo Japan, SD memory cards, and others.

As mentioned above, the electronic device 20 includes an audio sensor 23 for detecting the sounds of the camera 10 during operation. The audio sensor 23 is connected to an acoustic pattern recognizer 30 in the electronic device 20. The acoustic pattern recognizer 30 is also connected to the image processor 26, and is operable to match the acoustic patterns received from the audio sensor 23 with the timing of the shutter opening. As a result, it is possible to develop a set of acoustic patterns that accurately predict (milliseconds in advance) the opening of the shutter of the camera 10 to take a picture. This allows the electronic device 20 to stay in a low power listening mode until just before the shutter opens to capture an image. When the acoustic pattern recognizer 30 determines that the shutter is about to open, it causes the processor 26 to enter an image capture mode that has relatively higher power consumption. This reduces the power demand during time periods when the device 20 is not in use, and also eliminates unnecessary image capturing when the camera shutter is closed.

The electronic device 20 includes a training mode to develop a set of acoustic patterns that match the shutter operation of the particular camera 10 in which the device 20 is to be used. The training mode allows the device 20 to be easily adapted for use in almost any film camera without knowing in advance the particular acoustic pattern associated with the camera's shutter operation. Thus, the electronic device 20 does not need to be manufactured or programmed differently for each specific camera model. The training mode allows for differences between different camera models and even differences among the same camera model, which might be caused by different use patterns, manufacturing tolerances, and so forth. By incorporating the training mode in the electronic device 20 of the present invention, it is possible to adapt the device 20 for use with any particular camera designed to use the same size film.

Figure 4:
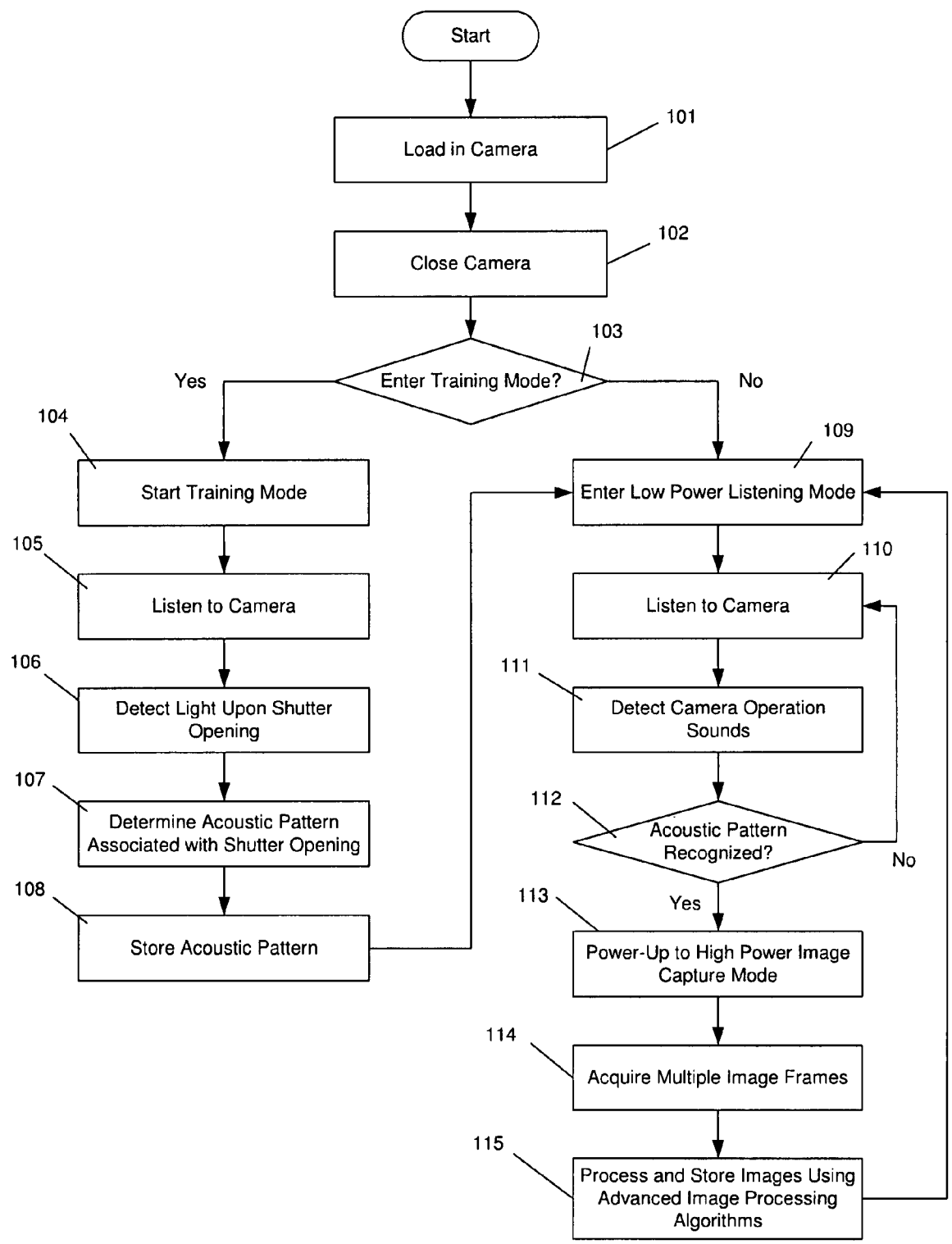
FIG. 4 is a flowchart illustrating the operation of the electronic device, including a training mode for developing a set of acoustic patterns associated with the shutter operation.

The process of converting a film camera 10 into a digital camera using the electronic device 20 of the present invention will now be explained with reference to FIG. 4. In step 101, the electronic device 20 is loaded into the camera 10, and then the back 11 of the camera 10 is closed in step 102. The device 20 then automatically or manually enters the training mode in step 103 to develop a set of acoustic patterns for the specific camera in which it is placed. In one exemplary embodiment, the training mode is entered automatically each time the device 20 is inserted in a camera 10 (e.g., using pressure switches on the device 20 that detect the closing of the camera back 11).

The training mode starts in step 104 by powering up the processor 26 and the other circuits of the device 20. As indicated in step 105, the audio sensor 23 is used during the training mode to listen for and detect sounds within the camera 10. The user is instructed to press the shutter button 14 of the camera 10 at least once during the training mode to cause the shutter to open as if taking a picture. The shutter button 14 can be pressed multiple times during the training mode to allow the acoustic pattern recognizer 30 to fine tune its set of recognized acoustic patterns. The opening of the shutter and, more importantly, the movement of various other parts of the camera 10 in connection with opening the shutter, create a unique acoustic pattern within the camera 10. The acoustic pattern is detected by the audio sensor 23 and fed to the acoustic pattern recognizer 30. In step 106, data from the image sensing array 22 or a separate light sensor is detected and then used in step 107 to match the timing of the shutter opening with the detected acoustic pattern. The acoustic pattern and its precise timing correlated to the shutter opening, the start frame, the end frame, the background noise level, the signal-to-noise ratio, and so forth, are determined in step 107 and then stored in the acoustic pattern recognizer 30 in step 108. The training mode is then complete and the acoustic pattern recognizer 30 will be able to accurately predict the start and end of the shutter opening for that particular camera 10.

The acoustic pattern recognizer 30 can have some preloaded patterns from other cameras so that the electronic device 20 has a model and general idea what to expect from the user's camera 10. The preloaded patterns will be compared with the acoustic patterns detected during the training mode to develop a more precise acoustic pattern associated with the shutter operation of the user's camera 10. The acoustic pattern recognizer 30 can also be set to fine tune its recognized patterns every time the user presses the shutter button 14 to continue to improve its recognition performance specific to the camera in which it is loaded.

After the training mode is complete, or if the training mode is bypassed (e.g., the shutter is not activated within a predetermined time period), the device 20 enters a low power listening mode in step 109. In the listening mode, the audio sensor remains in a low power listening state 110 until camera operation sounds are detected in step 111. When camera operation sounds are detected, the acoustic pattern recognizer 30 compares the detected acoustic pattern in step 112 with the known acoustic pattern(s) stored during the training mode. If the detected acoustic pattern is not recognized, the process remains in the low power listening state 110 and continues to listen for camera operation sounds. A threshold sound level can also be used so that the circuits of the acoustic pattern recognizer 30 are kept in a low power state until the noise within the camera 10 exceeds a predetermined threshold, at which time the circuit of the acoustic pattern recognizer 30 wakes up to determine whether the detected acoustic pattern is recognized as a pattern associated with the shutter operation.

If the acoustic pattern recognizer 30 determines in step 112 that the acoustic pattern matches the known acoustic pattern of the camera 10 just before the shutter opens, then a signal is sent in step 113 to power-up the processor 26, the image read-out circuit 25 and the image sensing array 22 into the high power image capture mode. In step 114, the processor 26 controls the image read-out circuit 25 to acquire multiple image frames from the image sensing array 22 during a single opening of the camera shutter. For example, a sequence of five image frames can be captured during a single shutter opening event. The multiple image frames are then processed in step 115 and stored in the memory 28 of the device using advanced image processing algorithms, as further explained below. By accurately predicting in advance when the shutter of the film camera 10 will be opened, the present invention allows a low power energy-saving mode to be used while still ensuring that multiple images can be captured from a single shutter opening. The process continues to cycle through these steps 109-115 until the memory 28 is full or the camera back 11 is opened to remove the device 20.

It should also be noted that acoustic pattern adaptation may be ongoing. For example, every time an acoustic pattern is successfully recognized the existing acoustic pattern may be modified so that adaptation can take place. In this way, the stored acoustic pattern and corresponding recognition can continuously improve and also evolve where acoustic changes that might occur after long periods of time (e.g., due to wear and tear of shutter internal parts and the like). This adaptation may occur based upon each acoustic pattern recognition event, based upon the results of several stored acoustic pattern recognition events, or based upon a training review prompted at regular periods, etc.

The image processor 26 of the electronic device 20 performs all necessary image processing functions on the sequence of images captured by the image sensing array 22. The image processor 26 is programmed with motion estimation algorithms and advanced image processing algorithms to improve and enhance the quality of the images captured by the device 20. An exemplary set of such advanced image processing algorithms is illustrated in FIG. 5.

Figure 5:
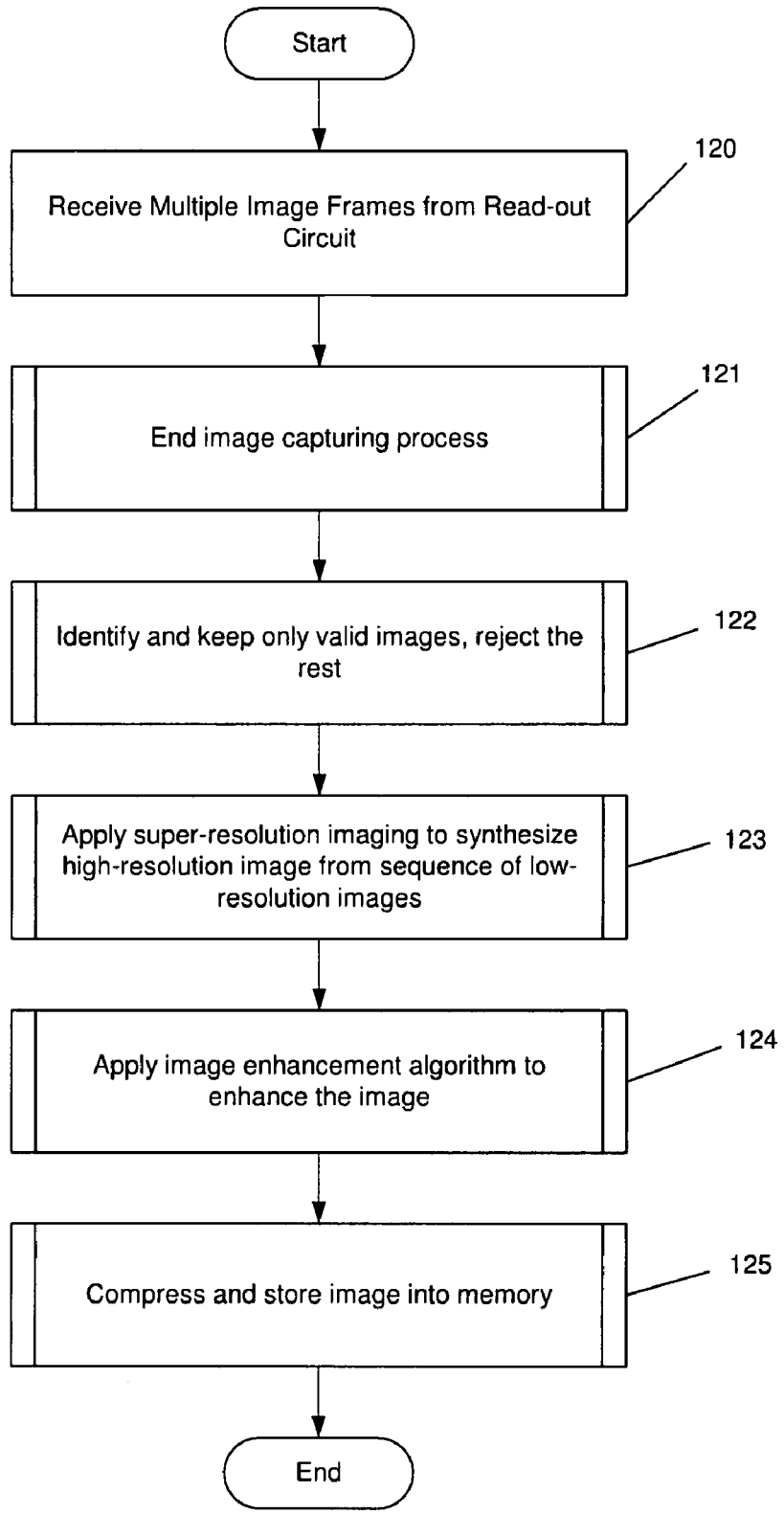
FIG. 5 is another flowchart illustrating the operation of the image processor of the electronic device.

As illustrated in FIG. 5, the image processor 26 receives multiple image frames from the read-out circuit 25 in step 120. The image processor can be programmed to cause the read-out circuit 25 to end the image capturing process in step 121 after a predetermined number of image frames are captured, or once the image data indicates the shutter has closed. The image processing algorithms are then used by the image processor 26 in step 122 to determine which of the image frames captured for each shutter opening event are similar ("valid") and to reject the rest as being either too early or too late relative to the shutter opening (typically, none of the frames will be identical because of the camera movement or the movement of the subject).

The image processor 26 then applies a super-resolution imaging algorithm in step 123 to synthesize a high-resolution image from a sequence of low-resolution images captured during the shutter opening. For example, the electronic device 20 might use a 1-Megapixel camera sensor, but because of the super-resolution imaging it will produce a 5-Megapixel image from a sequence of lower resolution images. Conventional super-resolution processing techniques may be implemented by the image processor to accommodate this functionality. The image processor accesses a set of images corresponding to the same image capture session and performs any aliasing and pixel shifting to accommodate merging of the images to the high-resolution image. If desired, where motion estimation functionality is incorporated, the determination of motion may be correlated to the capture of images and that information is incorporated into the super-resolution imaging algorithm in order to accommodate for motion that may have occurred during image capture.

In addition to, or instead of, the super-resolution imaging algorithm, the image processor also includes an image enhancement algorithm, as depicted in step 124. The image enhancement algorithm can be used to enhance a relatively low quality image for better resolution and picture quality. Various image enhancement algorithms may be implemented, including but not limited to those that implement edge detection and processing, shape recognition, contrast factors, color factors, and others.

Once the advanced image processing algorithms complete their image processing in steps 121-124, then the processed image is compressed and stored in the memory 28 of the electronic device 20 in step 125. The images stored in the memory 28 can be transferred to an external computer using suitable peripherals, such as a communication port (e.g., USB port) on the electronic device, a radio frequency communication device, or other known data transfer techniques and devices.

The electronic device 20 of the present invention is camera independent and can be manufactured in the form factor of all popular film formats and cameras. Since the device 20 develops its own set of recognized acoustic patterns in whatever camera it is placed, its correlation between the camera's shutter operation and the image capturing mode is highly accurate and readily adaptable to any camera in which the device is loaded.

When the memory 28 is full or the battery is low, the device 20 can be equipped to emit audible warnings to the user. In another embodiment, warning and status messages can be displayed on a wireless control panel affixed to the outside of the camera body 12.

The system and method according to the present invention provide a non-invasive way of transitioning from film to digital photography, while keeping and using existing photographic gear. The transition using the present invention is simple and does not risk damage to the film camera in case the user desires to convert the camera back to film use. The user does not need to learn any complicated procedures for using a new digital camera. The technique is non-invasive so no modifications to the existing film camera are needed. The cost of making the conversion is low because all existing photography gear can be reused. The existing camera can continue to be used for exposure and focus control in a normal manner.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically illustrated or described in detail to avoid obscuring aspects of embodiments of the present invention.

The embodiments of the present invention produce and provide systems and methods for noninvasive conversion of film cameras into digital cameras. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A system for converting a film camera into a digital camera, comprising:
   an image sensing array;
   a read-out circuit coupled to the image sensing array;
   a memory coupled to the read-out circuit for storing a digital picture derived from an image read-out from the image sensing array;
   an audio sensor for detecting sounds within the camera;
   an acoustic pattern recognizer that compares signals received from said audio sensor to determine if the signals correspond with acoustic patterns associated with shutter operation, said acoustic pattern recognizer having a training mode that can be used to develop a set of acoustic patterns associated with shutter operation based on signals from said audio sensor during said training mode; and
   an image processor associated with said image sensing array and said read-out circuit, said image processor being operable to end an image capturing process,
   wherein said image sensing array has a low power listening mode and an image capture mode and is configured to switch from said listening mode into said image capture mode when the pattern recognizer recognizes an acoustic pattern associated with shutter operation.

2. The system according to claim 1, wherein said system is packaged to be contained in a space vacated in the absence of film.

3. The system according to claim 1, wherein said pattern recognizer comprises a preloaded set of known acoustic patterns for film cameras that are compared with signals received from said audio sensor.

4. The system according to claim 1, wherein signals read out from said image sensing array during said training mode are used to determine when a shutter of the camera is open so that the acoustic patterns can be accurately associated with the shutter operation.

5. The system according to claim 1, wherein said read-out circuit is operable to capture more than one image frame from said image sensing array during a single opening of the film camera shutter.

6. The system according to claim 5, wherein said image processor is operable to identify and keep only valid images captured during the shutter opening.

7. The system according to claim 5, wherein said image processor is operable to apply super-resolution imaging to synthesize a high-resolution image from a sequence of low-resolution images captured during the shutter opening, to enhance an image captured during the shutter opening, and to compress and store an image captured during the shutter opening.

8. A system for converting a film camera into a digital camera, comprising:
   an image sensing array;
   a read-out circuit coupled to the image sensing array,
   an image processor associated with said image sensing array and said read-out circuit, said image processor is operable to end an image capturing process; and
   a memory coupled to the read-out circuit for storing a digital picture derived from an image read-out from the image sensing array;
   said read-out circuit being operable to capture more than one image frame from said image sensing array during a single opening of a shutter of the film camera,
   wherein said image processor is operable to apply super-resolution imaging to synthesize a high-resolution image from a sequence of low-resolution images captured during the shutter opening.

9. A system for converting a film camera into a digital camera, comprising:
   an image sensing array;
   a read-out circuit coupled to the image sensing array,
   an image processor associated with said image sensing array and said read-out circuit, said image processor is operable to end an image capturing process; and
   a memory coupled to the read-out circuit for storing a digital picture derived from an image read-out from the image sensing array;
   said read-out circuit being operable to capture more than one image frame from said image sensing array during a single opening of a shutter of the film camera, wherein said image processor is operable to identify and keep only valid images captured during the shutter opening, to synthesize a high-resolution image from a sequence of low-resolution images captured during the shutter opening, to enhance an image captured during the shutter opening, and to compress and store an image captured during the shutter opening.

10. A method of taking a digital picture with a film camera, comprising:

loading an electronic device comprising a memory unit and an image processor into a space vacated in the absence of film in the camera, and placing an image sensing array in optical communication with a lens of the camera when a shutter is open;

detecting sounds within the camera using an audio sensor; and developing a set of acoustic patterns associated with shutter operation based on signals from the audio sensor and the image sensing array during a training mode after the electronic device is loaded into the film camera.

11. The method according to claim 10, further comprising:

detecting sounds within the camera using the audio sensor in a low power listening mode;

determining if the detected sounds correspond with the acoustic patterns developed during said training mode;

switching said image sensing array into an image capture mode when the detected sounds correspond with an acoustic pattern associated with shutter operation;

exposing the image sensing array upon opening the shutter;

reading the image sensing array to acquire image data;

processing the image data within the image processor; and storing the image data in the memory unit.

12. The method according to claim 11, wherein reading the image sensing array to acquire image data comprises reading more than one image frame from said image sensing array during a single opening of the shutter.

13. The method according to claim 12, wherein processing the image data comprises processing the acquired image data to identify and keep only valid images captured during the shutter opening.

14. The method according to claim 12, wherein processing the image data comprises applying super-resolution imaging to synthesize a high-resolution image from a sequence of low-resolution images captured during the shutter opening.

15. The method according to claim 12, wherein processing the image data comprises enhancing an image captured during the shutter opening.

* * * * *